Oct. 15, 1946. B. L. CORSON 2,409,546
METHODS OF CONDITIONING AND TREATING LIME AND PRODUCT THEREOF
Filed July 15, 1940 3 Sheets-Sheet 3
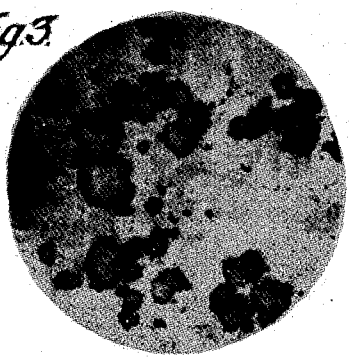
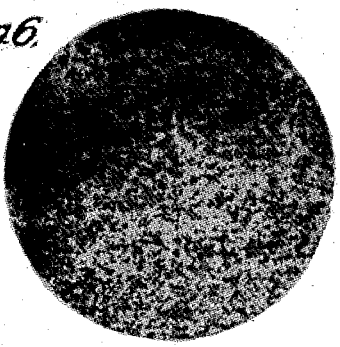
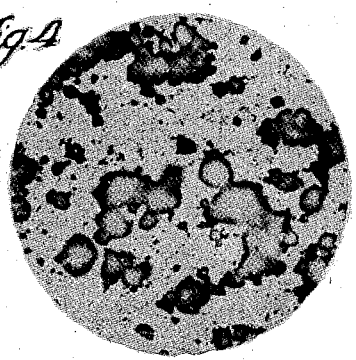
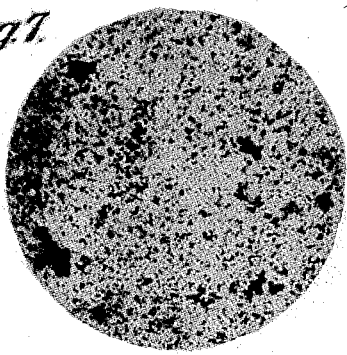
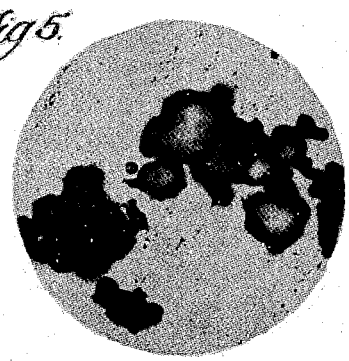
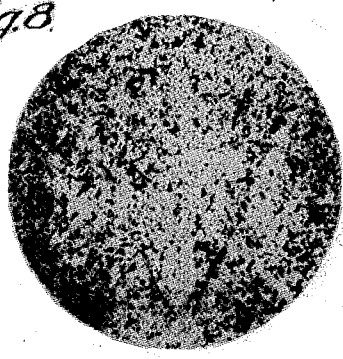
Inventor
Bolton L. Corson
by Attorneys Patented Oct. 15, 1946

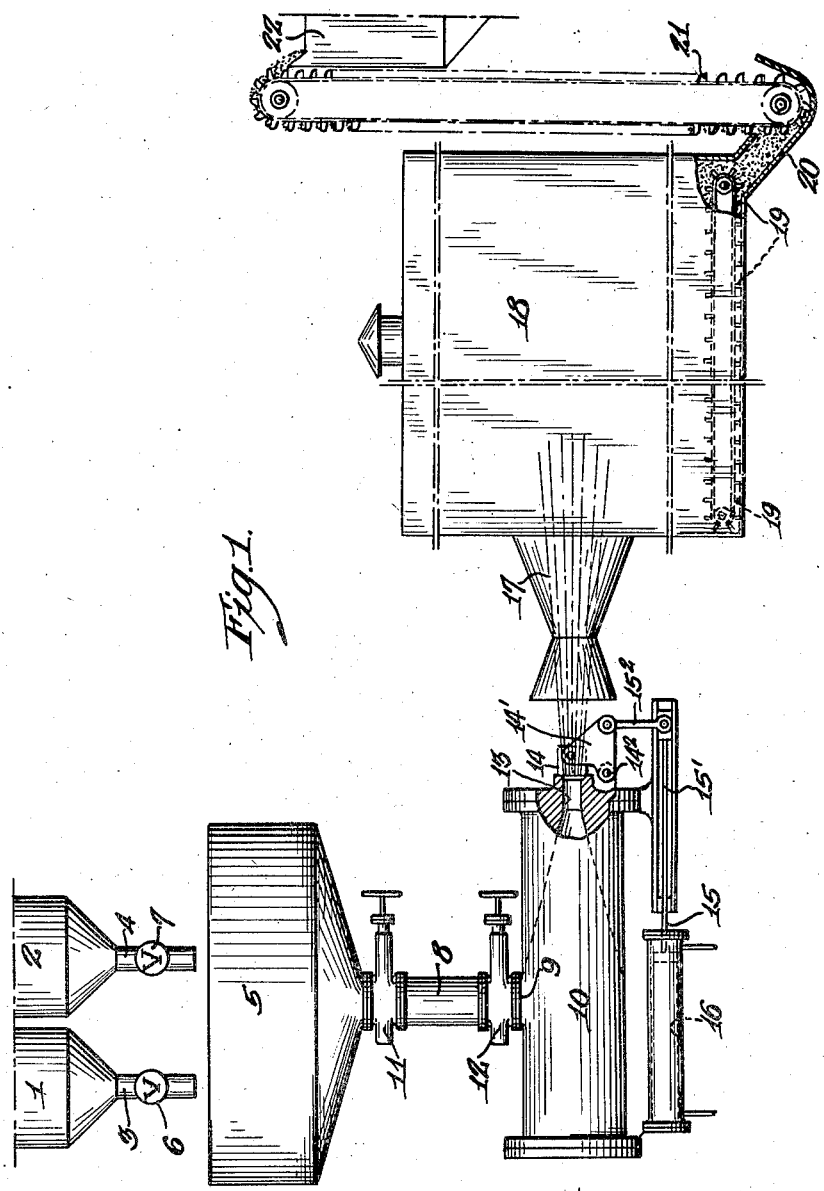

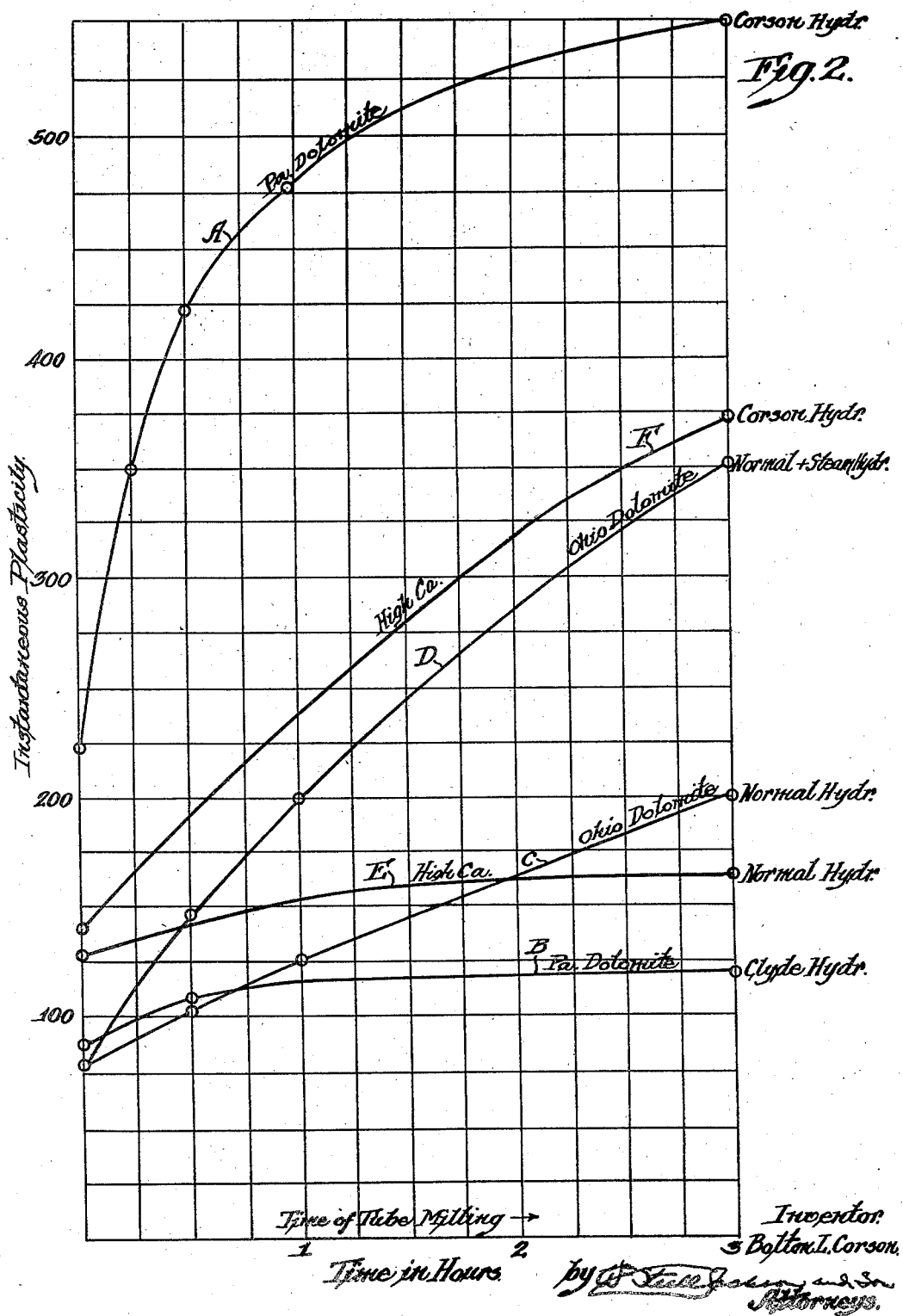

2,409,546

UNITED STATES PATENT OFFICE 2,409,546

METHODS OF CONDITIONING AND TREATING LIME AND PRODUCT THEREOF

Bolton L. Corson, Plymouth Meeting, Pa.

Application July 15, 1940, Serial No. 345,498

17 Claims. (Cl. 23—188)

The invention relates to the conditioning of lime as part of a continuing process including special or supplemental hydration and subsequent treatment and to the treatment of special hydrated lime. The invention is in part a continuation of my copending application, Serial No. 211,952, filed June 4, 1938, the disclosure of which is incorporated herein by reference and made a part hereof. U. S. Patent No. 2,309,168 has issued on an application also filed as a continuation-in-part of application Serial No. 211,952.

Since many inventors and writers have purported to disclose superior methods of hydrating lime in ways which clearly can not secure the results announced, and the present invention is directed in part to superior hydration and as to subsequent treatment depends in large measure upon the extent of hydration and as to the hydration of the magnesium content particularly, speed in hydration, methods, conditions and results of hydration are discussed first in order to teach the public how to practice the invention in the best way known to me. However, the present invention is concerned not only with hydration of lime but with further treating of specially hydrated lime.

Lime is classified by the trade as of several types. One is called high calcium lime and usually contains about 97% calcium oxide and 1 or 2% magnesium oxide (magnesia). What is called a magnesium lime usually contains about 10 to 20% magnesium oxide and the remainder calcium oxide. Then there are dolomitic or high magnesium limes which contain anywhere above 20% and up to 44% magnesium oxide and the rest (except for impurities) calcium oxide. All of these limes usually contain at least 1 or 2% of impurities in the form of silica, iron, alumina, etc.

Previous to the turn of the century all lime for construction work was supplied to the builder in quicklime form. Most of this was lump quicklime but some of it was pulverized quicklime and to this quicklime sufficient water was added so that hydration took place and a lime putty was formed. This putty was then mixed with sand for plastering, stucco, mortar, etc.

About 1900 a product known as hydrated lime was introduced on the market and has been used in increasingly large quantities since. In the hydration of this lime a limited supply of water was used so that the calcium oxide changed from lump or pulverized quicklime to the hydroxide form but no excess water, or practically none, was allowed to remain with the hydroxide, so that it became a dry powder.

When these limes are hydrated by the ordinary process very little of the magnesium oxide is hydrated. It is the practice to soak such hydrates when used for finishing coats in water over night, or, more usually, twenty-four hours in order to prepare them for use. Their "instantaneous" plasticity, that is, without soaking, is very low and even with the soaking the plasticity of most dry hydrated lime is very little improved and remains low. As a practical result substantially all of the hydrated magnesium limes which were to be used as finishing limes prior to my inventions had to be soaked over night, at least, to secure additional plasticity before use as finishing limes.

The change to this dry powdered hydroxide form eliminated much of the slaking operation on the job and had other advantages in that the lime may easily be handled and stored, was quicker in preparation and is more uniform than lime slaked on the job.

Most hydrated limes of the type indicated above are noticeably lacking in plasticity, that is, they do not spread easily under a trowel and tend to stick and pull, with the result that they are not in the best condition for use even as mortar or for rough coat plaster and it is difficult with them to obtain a finish coat. The strength characteristics of such hydrates are generally poor and they are not easily workable in mortars, plastering, etc. Furthermore, their bonding power, ability to retain water, and sand carrying capacity are low. For this reason such hydrated limes are not acceptable for finish coating and are also inferior to properly slaked quicklime for other uses.

It should be noted that lime putty made directly from the oxide form is hydrated lime but the resulting putty is never referred to as hydrated lime by the construction trade; the term hydrated lime being applied only to the dry, hydrated powder. It is to be noted also that "dry hydrated lime" of the trade often carries small percentages of free moisture not chemically combined.

Plasticity, as it refers to lime might be defined as a property which renders the lime capable of spreading easily on an absorbent surface, that is, as put by Mr. Emley in his "Measurement of Plasticity," it depends directly upon the ability of the material in putty form to hold its water against the suction of an absorbent surface to which it is applied.

The Emley plasticimeter is a machine which has been developed by the Bureau of Standards for measuring plasticity. The higher the rating the more plastic the lime. The putty made from ordinary hydrated lime, soaked before use will receive a rating of about 100 on this machine. Limes which are known as finishing limes must receive a rating of at least 200 after soaking with water twenty-four hours.

To be called a "finishing" lime it must be suitable for spreading in a thin coat on the plaster base of a wall as a "finishing" coat.

There is a section of this country, located in northern Ohio, where the limestone has certain natural qualities which permit the manufacture of a hydrated lime, which, after soaking with water approximately twenty-four hours, develops a plasticity of about 250 as registered by the Emley plasticimeter.

There are many properties which are desirable in lime and these properties can be attained with limes of widely different chemical composition and geographical location if the fundamental principles of proper hydration are followed.

To begin with a large excess of water must be present at the time of hydration. By this it is meant that there must be water in the liquid phase available to practically every particle of the lime at least at the time that particle of the lime has its calcium oxide changed from the oxide form to the hydroxide form.

In many processes limes are mixed with considerably more water than is necessary to satisfy their chemical requirements, but the heat of hydration is so great that, in the absence of a restraining influence present to prevent this water from changing to steam and leaving the lime, when the greater portion of the lime is hydrated it is hydrated in an atmosphere of steam rather than being surrounded by water in the liquid phase. Attempts have been made to overcome this weakness by endeavoring to prevent the temperature of the water from rising above 212° F. In such cases the hydration of the lime is slowed down and this has quite a detrimental effect on plasticity due, it is believed, to the formation of larger crystals.

The second point which is essential is that the water shall be intimately mixed with the lime and it is therefore preferable to have the quicklime ground finely enough so that the water can get to all of its easily. Another point is that it is very essential to have quick hydration. The hot chamber into which the lime and water are poured in my process speeds the action of hydration and is of advantage.

The elevated temperature and pressures during the reaction, of course, not only greatly speed the hydration but help to produce a finely divided hydrate and to thoroughly hydrate even the magnesium oxide which in normal hydration processes hydrates little, if any. It may be further noted that in this process as practiced the steam present comprises an extremely small amount only of the water content present at the time of hydration. It has been shown that calcium oxide hydrated solely in the presence of steam is extremely non-plastic.

Having used the great excess of water to form an extremely plastic, finely divided mixture of lime and water there is a very difficult problem as to how this can be dried without loss of the desired properties. By this it is meant to point out that if the ordinary mixture of lime and water is dried by the usual methods employed for drying similar mixtures, the plasticity and other properties are definitely destroyed. If, however, the explosion process as outlined herein and in my previous application above is used, then this process acts as do all spray drying processes to dry the material spontaneously by passing it through air that is capable of absorbing from the finely dispersed particles the moisture which is adhering to them, leaving them substantially dry and with their basic properties unaffected. It is for this reason that spray drying is used in the drying of milk, fruit juices, etc., where the delicate enzymes must be carefully dried to prevent injury.

Hydration by a large excess of water at elevated pressures and temperatures is helpful with high calcium limes because the hydrate secured by the rapid hydration is more colloidal and less crystalline than otherwise it would be and because the hydration is more reliably complete. In addition the process has high utility when it is applied to a magnesium or a dolomitic lime because the temperature above 212° F. and the pressure above atmospheric overcome the difficulty mentioned previously in hydrating the magnesia.

I have discovered that if the lime be hydrated first with plenty of water to take care of the calcium oxide, steam can be used beneficially for additional or supplemental hydration, as the calcium content will not then be harmed and the steam pressure and temperature can be used beneficially upon the magnesium content. It is to be understood, of course, that the resultant product herein obtained may be substantially dry after supplemental hydration, in which case, the surplus water remaining with the product after the hydration of the calcium oxide is not substantially greater than that required for the hydration of the magnesia. However in the event that it is necessary to dry the lime then it must be done in a manner that will not destroy the desirable properties obtained by the large excess of water and by other circumstances which may have surrounded its hydration.

In the case of a normally non-plastic lime this may be carried out by using sufficient water not only to hydrate the calcium oxide but so that a surplus of water is left in the liquid phase in the product and this material may then be subjected to steam pressure for the subsequent hydration of the magnesium oxide.

The additional hydration can be effected best by the use of plenty of water at steam pressures, then drying the product by effecting a finely divided dispersion thereof under conditions which will evaporate the water, described in my application above. This way involves a quick reduction in pressure.

In the most advantageous form of the invention of my previous application above, later described in connection with the drawings because of the close relation to this invention, I mix the lime with a considerable excess of water while confining the mixture so as to maintain the liquid phase of the reaction mixture and use the heat from the reaction to increase the temperature much above the normal boiling point of the water and correspondingly to increase the pressure within the reaction chamber and then, when the reaction is completed, I dry the hydrated reaction product by effecting a finely divided dispersion of said product under conditions, or into an atmosphere, capable of absorbing the excess water from the product. This may be done in various ways, as, for example, spray drying, in a Raymond mill or otherwise, under proper conditions of temperature, but I prefer to accomplish it by suddenly reducing the pressure within the reaction chamber to atmospheric pressure, using the explosive effect of the sudden reduction of pressure and temperature to expel the hydrate from the reaction chamber. In successful hydration as above I have secured excellent results, exothermically running the pressure up to about 600 lbs. per square inch. However I do not wish to imply from this that a pressure of 600 lbs. or thereabouts is necessary; because as a matter of fact, successful operation has been accomplished at a pressure of 40 lbs. It depends on several factors, such as the design of the reaction chamber, the design of the collector chamber, output desired, etc.

The instantaneous evaporation of the water effected by the sudden reduction of pressure dries the hydrate into a powder and the explosive force effects a dispersion of the product into extremely fine particles. The fineness of the powder leaves no advantage to be secured from a pulverizing mill in the way of further reducing the size of the particles of the hydrated lime. This, of course, does not refer to the grinding of any impurities or inert material that may be present with the pulverized quicklime at the time it is put into the pressure chamber.

The product thus secured from ordinary lime, whether high calcium, magnesium or dolomitic, has a plasticity in excess of 200 which is developed immediately upon mixing with water; as compared with a plasticity for all other limes of about 100 when first mixed with the water.

It will be seen that the lime is treated under the most favorable conditions for both calcium and magnesium, namely, supplying the quick hydration by a large excess of water which is needed by the calcium and at the same time the heat and pressure so needful for the magnesium.

The product also attains unusually high sand carrying capacity and other beneficial properties.

The present invention is directed to the effective conditioning of lime and also to further treatment of lime hydrated by my process so as to retain the benefits of my previous invention above and to secure still greater plasticity. It is also directed to the treating of other dry lime hydrates in which the magnesia to a large measure, has also been hydrated.

A further purpose is to hydrate lime in an excess of water under steam pressure and temperature, to disperse the product and to evaporate the water from the hydrate so as to deposit the hydrate dry.

A further purpose is to prepare a special dry hydrated lime, finely divided, having a high initial plasticity when it is first formed into putty and to treat the dry hydrated lime by collecting or gathering operation such as a pounding operation between surfaces, not for the purpose of reducing the size of the particles but for the purpose of gathering the particles together into groups or clusters of larger-than-particle size.

A further purpose is to gather relatively dispersed small particles of lime together into groups or clusters which because of the close relation of the particles in the groups or clusters (and perhaps also because of the fineness of the particles making up the groups or clusters and the high percentage of magnesium oxide hydrated) require less water to form putty, shrink less on drying and during application are able to hold their water better against the suction of absorbent surfaces to which they are applied than are the same particles in their more dispersed relation.

A further purpose is to hydrate mixed oxides of magnesium and calcium beyond the point necessary for the calcium oxide and to a point where the magnesium oxide is in large measure (in practice substantially completely) hydrated, to dry the hydrated product by dispersing it in finely divided particles under conditions capable of absorbing the water, and to collect the dried particles into groups which, when wet into a putty and by reason of the close relation of the particles are able to hold the water to advantage against the suction of a surface to which they are applied, thus increasing the plasticity of the product.

A further purpose is to collect the particles of a lime of the character indicated together to greatly improve the quality of the lime, providing at once increased ability to retain water, with a reduction in the amount of water to be added in use to make a putty of normal consistency—lessening the tendency for the lime to shrink and crack in drying and thereby improving it for certain uses.

A further purpose is to more finely divide a freshly hydrated lime and to gather together the discharged particles by milling in order to increase the plasticity and otherwise improve the character of the hydrated particles.

A further purpose is to further condition a lime in which both the calcium and magnesium content has been well hydrated and by milling between surfaces, not only to change the mechanical form but to change the characteristics as affecting use for mortar, normal plaster, finishing plaster, etc.

Figure 1 is a side elevation partly sectioned, showing mechanism for hydration of lime.

Figure 2 is a group of curves showing the effect of milling.

Figures 3, 4, 5, 6, 7 and 8 are photo-micrographs showing the materials discussed. These photo-micrographs are all taken at 200 magnification.

In the drawings similar numerals indicate like parts.

In Figure 1 the mechanism shown is almost wholly diagrammatic. It is given by way of illustration only in order to offer one mechanism—of many, by which the hydration in the presence of water in excess in the liquid phase under high pressure and temperature conditions may be effected with subsequent drying. Both the hydration method and means shown and the method and mechanism for drying are very effective and the best known to me. The mechanism comprises supply tanks 1 and 2 of such capacity and permissibly in such proportion as will give excess water content to the mixture of approximately twice the amount of water needed to hydrate both the magnesium and calcium oxides. A large excess of water is maintained during hydration.

As shown the outlets 3 and 4 feed the content to a mixer 5 through valves 6 and 7 by which the flows are controlled.

The mixer discharges through a conduit 8 and an opening 9 into a high pressure cylinder 10. Valves 11 and 12 are provided in the conduit, the latter being capable of resisting high pressure. Hydration takes place within the cylinder 10 and is exothermic, the heat developed from the reaction raising the content to a high temperature and pressure. Discharge from the cylinder takes place through a small discharge nozzle 13 which is controlled by a quick opening valve 14 capable also of resisting high pressure.

The valve 14 is intended to open very rapidly from fully closed position to fully open position.

It is controlled by piston and rod 15, the piston movable in a cylinder 16. The cross head 15' operated by the piston rod is connected with the valve 15 by line 15² and wrist plate 14' fulcrumed at 14².

Discharge from the cylinder may take place through a Venturi section 17 to supply air into a settling chamber 18 from which the dry hydrate formed is removed by a horizontal conveyor 19 into a boot 20 from which a vertical conveyor 21 leads to a storage compartment 22.

It is highly desirable to keep the operation in cylinder 10 in the liquid phase of the mixture and for this purpose the solid content and water should very nearly fill the cylinder 10. For example 300 lbs. of pulverized dolomite quicklime and 223 lbs. of water are mixed until a free-flowing slurry is produced. The valves 11 and 12 are then opened and the slurry is allowed to flow through the pipe into the pressure cylinder, the exhaust valve to the small discharge opening being tightly closed.

The chamber 10 is preferably of such size that the slurry mixture of quicklime and water initially occupies approximately 50% of the interior, leaving a space of 50% within the cylinder before hydration begins. This space is considerably reduced by expansion of the slurry during hydration so that only tiny spaces remain in the cylinder between the lime particles. Since the action is exothermic this remaining space is occupied by steam. In the operation described as actually practiced the pressure has risen within three or four minutes to 600 lbs. per square inch and then has dropped to about 400 lbs. per square inch at the end of about seven minutes, apparently due to absorption of heat by the cylinder. This steam at such a pressure contains only .086 lb. of water per cubic foot and therefore less than 1% of the water is converted into steam, with the result that hydration of the slurry is effected substantially entirely by the water. Both the calcium content and the magnesium content have been hydrated thoroughly.

After the hydration the lime must be dried and this is to be done by evaporating the moisture. The drying effect takes place because of the flashing of what has been free moisture, i. e. water in the liquid phase, into steam, removing the water from the surfaces of the individual units of the lime. For this drying function it is better to have the flashing from water in the liquid phase to steam take place instantaneously from the entire mass. My invention is beneficially employed, however, even if the flashing be progressive as in spray drying.

When the pressure is suddenly released that large quantity of water which is in excess of that required to chemically satisfy the lime and which permeates the mass is immediately converted into steam with an explosive action not only causing discharge of the mass from the cylinder but breaking up the particles into extremely fine pieces.

The chamber 18 was quite large, being 72 ft. in length, and having an outlet at the top. The air in this chamber is maintained at such a temperature and relative humidity that it is capable of absorbing the excess water which has been discharged from the cylinder and after this water is absorbed by the air the moisture vapor rises and passes out of the outlet pipe. The hydrated lime, however, sinks to the bottom of the chamber and is collected by a suitable conveying system.

There is an advantage in plasticity to be secured by limiting the free discharge of the steam slightly because in the treatment in the tube mill high plasticity is attained earlier where the hydrate is not quite fully dry.

The high temperature and pressure at which hydration takes place are quite desirable for quick and complete hydration of the magnesium. Being secured exothermically they are economical in operation. The heat available might otherwise merely be wasted. However it is to be noted that the transition of the water into steam, whatever the pressure originally, is used in blowing the contents from the cylinder, in breaking up the particles into smaller particles and in drying the hydrate. The transition from water to steam is secured where the pressures are low, even as low as 10 or 15 lbs. per square inch where for any reason such exothermic operation is not contemplated and the higher temperature for hydration is not sought.

The present application deals with methods of specially hydrating limes and of subjecting them or other limes which have been thoroughly hydrated to a further processing treatment, whereby a very much higher, in fact, almost unlimited degree of instantaneous plasticity is obtainable. The further processing is fundamentally subjecting the lime to a pounding action as by a tube, ball or rod mill.

The use of a tube, ball or rod mill for treatment of ordinary lime hydrates is not new but its use has been for a wholly different purpose than mine, namely for the purpose of finely dividing, including grinding impurities or lime particles which are of too large a size for use along with the dry hydrates of calcium and magnesium from which they have been separated out or in the company of which they are pulverized. It has not been for the purpose of increasing plasticity. There has been no intention to increase plasticity. In fact, the plasticity of ordinary hydrated lime is little if any affected by ball milling, rod milling or tube milling.

As a matter of fact very little tube-, ball- or rod-milling of lime is done at present because the Raymond type of mill has more or less completely supplanted the tube, ball and rod mills.

As agglomerating is used herein it is intended to refer to an action which takes place in the pounding of special limes or limes which have been specially hydrated between surfaces such as in a rod mill, ball mill or tube mill and which cause the particles to be collected or gathered or combined into clusters.

The essential feature of the agglomerating action is the application of very high concentrated pressure to the lime in order that small clusters may be formed and while the above mentioned mills all do this I do not wish to limit my processes to the use of them only, it being obviously possible to devise other means of accomplishing similar results.

By one part of the present invention high calcium limes and particularly magnesia and dolomitic limes—emphasized here because of the previous difficulties in hydration of the magnesia—which have been hydrated by me in ways providing high initial hydration, including the hydration of the magnesia, are quite rapidly and inexpensively treated not only greatly to increase their plasticity but considerably to consolidate them, and to increase their ability to retain water and their consequent ability to dry in use with little shrinking or cracking.

This further processing comprises tube milling the dry hydrated lime already high in hydration or which has been hydrated additionally, the pounding operation consolidating the particles of lime into relatively rounded aggregates, groups or clusters of particles throughout the lime. The milling operation is carried out by any suitable ball, tube or rod mill. Even fifteen minutes of milling with a thoroughly hydrated dry hydrate gives excellent results, where the hydration has been by my process.

It has not been considered necessary to illustrate the ball, tube or rod mills used as there are many makes on the market of each of the types, and many firms manufacture these.

Among makers of all three types, i. e., ball mills, tube mills and rod mills, may be mentioned Abbe Engineering Company, New York; Allis Chalmers Mfg. Company, Milwaukee; Alsing Engineering Company, Inc., New York; and Hardinge Company, Inc., New York.

For convenience in reference to these mills I will call them generically tube mills and treatment in them generically tube milling.

I have found that my treatment of dry hydrated lime in a tube mill is highly beneficial to any dry hydrated lime which has been hydrated at high pressure and temperature with a large excess of water, with proper drying such, for example, as sudden reduction of temperature and pressure, in accordance with my previous invention. This is true of high calcium limes hydrated in accordance with my previous invention, because of the effect of this process upon the physical structure of the product, and is true also of magnesium and dolomitic limes; but the application to dry hydrated magnesium limes and particularly to dry hydrated dolomitic limes has been emphasized because limes containing magnesium have in the past represented a much more difficult hydration problem than have the high calcium limes, and a problem more difficult in proportion to the magnesium content.

All these dry hydrated limes, including Pennsylvania and other dry hydrated limes, previously considered incapable of exhibiting high plasticity, have their plasticity much improved by the tube milling, whether by tube mill, ball mill, or rod mill, when they have been hydrated in one step under pressure or when, in the case of magnesium limes, after hydrating the calcium oxide with a large excess of water at a pressure at which the magnesia is not substantially hydrated, they are additionally hydrated under pressure to much increase the percentage of magnesium hydrate present.

Notwithstanding their fairly high ultimate plasticity after soaking, "Ohio" limes are greatly improved in instant plasticity if hydrated as above described. However, any dry hydrated lime which has been supplied with a large excess of water at the time of hydration and subsequently dried without injuring its properties, and dry hydrated limes which become plastic on soaking, which have been hydrated in a conventional manner and subsequently have been additionally hydrated by steam under pressure will respond rapidly to treatment in a mill where they are pounded between surfaces.

Notwithstanding that from the above explanation it is clear that the plasticity of certain dry hydrated limes may be greatly increased by treatment in a tube mill it is equally clear from curves hereinafter discussed that it may not be worth while treating in a tube mill those hydrated limes whose plasticity does not improve quickly upon treatment. This is due to the expense of running the tube mill and to the fact that unless the hydrated lime be increased in plasticity sufficiently to bring it into a different classification, such as a finishing lime, the expense of even short-time tube milling may not be justified.

In tests made recently a ball mill 22 ft. long and 5 feet in diameter operated by a 100 H. P. motor was found to properly mill hydrated lime in fifteen minutes. Thousands of tons of Pennsylvania lime have been so treated and have been sold.

Even though the plasticity curve of a dry hydrated lime goes up rapidly with the time of treatment it may be desirable to set a standard index of plasticity to be reached, such as 350 on the plasticimeter scale for example, and cease the tube mill treatment when the dry hydrated lime has reached the plasticimeter index selected. From Figure 2 it will be seen that this plasticity number would be reached in curve A, for Pennsylvania dry hydrated lime, hydrated according to my previous invention, in about fifteen minutes. Such a determination must rest on policy in view of the commercial needs and price appreciations of high plasticities, etc.

I have found that in the present situation there is but little commercial advantage in tube milling a magnesium or dolomitic dry hydrated lime unless previously the calcium has been hydrated with an excess of water in the liquid phase and the greater part of the magnesium content has been hydrated; and that at the present time there is little commercial advantage in tube milling high calcium lime unless it has been hydrated in accordance with my previous invention.

Along with the advantage of greater plasticity secured by the tube milling of the present invention, the higher extent of hydration required as a preliminary for tube milling a dolomitic or magnesium lime and the conversion of a lime— even an "Ohio" lime—from a condition requiring soaking before reaching the desired plasticity to one in which the plasticity is reached almost instantly, give distinction to the lime so treated and a clear advantage in use.

For "Ohio" lime or limes which develop plasticity with soaking, additional hydration is required for best results if previously it has been hydrated in the normal way, in order that a major part of its magnesium content shall have been hydrated before milling. This again emphasizes the fact that the invention involves thoroughness of hydration. Even with "Ohio" limes, the best results are attained by hydration in the liquid phase with a large excess of water present at the time. However, after normal hydration of limes which develop finishing lime plasticity with soaking the dry hydrate can be steamed to insure that the major part of the magnesium (magnesia) is converted to hydroxide form. This material is benefited by treatment in the tube mill as can be ascertained from examination of curve D Figure 2. That is to say this quite simple process does give striking results although the use of my previously described hydration process gives preferable results.

There are several additional advantages gained by this tube milling of the above different types of lime besides that of increasing the plasticity, all of very considerable value.

The ability to retain water is considerably increased so that the time for water to appear after the normal consistency putty has been deposited on the opposite side of an absorbent surface is, in many cases, doubled. This means that the finishing coat, plasterers, mortars, etc., stay workable longer, giving a larger available spreading range.

The amount of water required to make a normal consistency is reduced. This means that a very plastic white coat, plaster or mortar can be made with small amounts of water and, therefore, upon drying the shrinking and cracking tendencies are lessened.

The lime is consolidated so much by the tube milling that a bulk of dry hydrate which would normally weigh say, 35 lbs. per cubic foot before processing will weigh 45 lbs. or more per cubic foot after tube milling. These figures are, of course, dependent on the amount of milling, the character of the mill and the type of dry hydrated lime, but are given as a typical example of the consolidation which takes place. This permits the dry hydrated lime to be held in a smaller bag, which saves considerable on the cost. The heavier lime sinks much more rapidly into the water when it is being mixed to a putty than would be the case when the lime is in a more fluffy form. Substantially the entire plasticity value is available immediately after mixing into putty.

When used as a whitewash the lime forms a thicker and/or more opaque coat because of its greater density.

In Figure 2 various curves are shown to indicate the effect of tube milling upon different dry hydrated limes.

The plasticity numbers are plotted vertically and the times plotted horizontally, the mill used being a standard tube mill.

In curve A the effect of tube milling upon a Pennsylvania dolomitic dry hydrated lime, hydrated in accordance with applicant's previous invention (of his aforesaid copending application) is shown. It will be seen that the curve of increase of plasticity by reason of milling starts at 225 and extends so nearly directly up that a rating of 350 is reached within the first quarter of an hour and 475 is reached within an hour.

In curve B the effect of tube milling upon Pennsylvania dry hydrated lime hydrated on a Clyde hydrator is shown. This is a normal product normally hydrated and without supplemental hydration and to which my earlier invention has not been applied. The advantage from tube milling is here so slight as to be negligible.

Curves C and D show the plasticity improvement by milling, C for normal "Ohio" dry hydrated lime in which there has been hydration by prior methods only, and D in which there has been a second (additional) hydration of the MgO by the use of steam. As will be seen, the improvement of instantaneous plasticity value due to tube milling was 120 for curve C in three hours, bringing the normal dry hydrated "Ohio" lime up to an instantaneous value of 200, whereas after additional hydration by steam three hours tube milling of a different sample from the same lot, curve D, showed an improvement of 270, bringing the instantaneous value up to 350.

In curve E is plotted the improvement in plasticity due to tube milling dry hydrated high calcium lime having normal hydration only, showing little increase. In curve F is plotted tube milled high calcium lime which had been hydrated in accordance with applicant's invention and the marked effect is obvious. This lime was an especially nonplastic lime.

All of the limes represented on this curve sheet had been tube milled and all are instantaneous values.

It is clear that the improvement in instantaneous value may itself be of definite benefit, even if the ultimate value does not exceed that secured after soaking.

Since the time element of miling enters into the commercial appraisement of the value of milling dry hydrated lime, this time element must be considered in determining the desirability or undesirability of milling a given lime.

The one curve which shows notably high increase in plasticity from milling is curve A. It evidently is well worth while to mill it even if the time be limited to a quarter hour. This is the lime which was hydrated according to the invention of the aforesaid copending application. On the other hand, the high calcium lime shows a value of 200 after a little more than a half hour of milling, which would bring the instantaneous plasticity of this lime up to the finishing lime class.

Both the high calcium lime and the "Ohio" lime with supplemental steam hydration, when milled three hours reach instantaneous values above the ultimate value after soaking reached by "Ohio" lime which has not been specially hydrated, the high calcium lime reaching an instantaneous value of 375 and the "Ohio" lime specially hydrated reaching an instantaneous value of 350.

In the micro-photographs, Figures 3, 4 and 5 show my preferred product, hydrated at high pressure and temperature, operating in the liquid phase, with suddenly reduced pressure to explode the product and to dry it, and finally tube milled. Compare with it Figures 6, 7 and 8. Figure 6 shows hydrate of normal "Pennsylvania" lime which has not been specially hydrated and in particular has not been subjected to hydration at high temperature and pressure and to sudden reduction of pressure to explode the particles. As will be seen the discrete particles are small. This was hydrated in a Clyde hydrator and fairly represents the normal dry hydrated lime of commerce as it has existed prior to my former invention. It has not been tube milled.

Figure 7 shows the product of Figure 6 after ball milling.

Figure 8 shows dry hydrated lime which was subject to my previous process at high pressure and temperature, the pressure having been suddenly reduced to explode the particles. This was not tube milled and it will be noted that the particles are very small.

The products of Figures 3, 4 and 5 show the highly hydrated lime of Figure 8 after tube milling. The photomicrographs show that the physical condition is tremendously changed. The collection or gathering together is quite evident.

From the curves it is seen that the instantaneous plasticity of dry hydrated lime processed in the usual manner is only slightly improved by milling. In contrast to this, limes hydrated by my prior invention; "Ohio" limes or other limes which, after conventional hydration, develop a correspondingly high plasticity on soaking, and which have the magnesia hydrated; and magnesium and dolomitic limes which have been hydrated with an excess of water at the time the calcium oxide content is hydrated and have been supplementally hydrated by steam or in a considerable excess of water as water to hydrate at least the major portion of the magnesia; show marked and rapid improvement.

The extent of drying is dependent upon the capacity of the air in the receiver to take up the water vapor resulting from expansion of the water. This can be varied, for example, either (a) by controlling the amount or moisture content of the air let in, i. e. by omitting the venturi, or using a smaller air inlet opening, or (b) by controlling the condition in the chamber itself by which a lower temperature in the chamber gives the air less capacity for taking up moisture. The speed of passage of the lime through the chamber and throttling the moisture in it are also effective.

The present invention is one of a type in which the facts of improved product and the qualities or characteristics by which the improvement becomes evident are well known but in which the theory upon which the improvement rests is not so well known or determined.

The speed of hydration affects the colloidal and gelatinous character or proportion as distinguished from the crystalline character of the hydrate, which in turn in considerable measure determines the plasticity; and also the colloidal and gelatinous form responds well to tube milling.

The features which stand out most clearly are that the invention works, treatment in a tube mill greatly increasing the plasticity and density of certain dry hydrates. Thus, the effect is most marked with dry hydrates hydrated at high temperature and pressure in the presence of a large excess of water, as water, though under like conditions operative even at low pressures and temperatures. The lime thus hydrated is advantageously removed from the reaction chamber and dried by reducing the pressure suddenly. The effect of the tube milling is also marked in the case of dry hydrates which normally develop plasticity with soaking and which have had their calcium oxide content hydrated by existing methods, and in the case of all high magnesium or dolomitic limes hydrated by an excess of water at the time of the hydration of the calcium oxide to provide a product having a surplus of water, when both of the last-mentioned types of hydrates have had at least a major portion of their magnesia additionally or supplementally hydrated as by steam under pressure or under circumstances providing an excess of water.

In explanation of the excellence of product from my preferred hydrate it would appear that the particles, and particularly the magnesium particles being more thoroughly hydrated as well as more rapidly hydrated than before, have very fine particle size and have a maximum quantity of fine particles of colloidal and/or gelatinous character. With the tube milling these minute discrete particles are collected or aggregated into groups or clusters in which the particles are loosely associated and which permit intergroup movement of the particles, one with respect to another, as well as a rolling of the group or cluster upon adjacent groups, clusters or surfaces.

The water colloidally associated with the groups or clusters or particles, though not in definite proportion to the particles at all times, may also allow interparticle movement by reason of which the capacity for ready distortion and recovery is improved.

The individual clusters, because of their association require less water for the clusters than would be required to wet the particles separately and the same association, that causes the particles of the clusters to require less water in the putty than would be required for the separate particles, appears to cause the clusters to hold the water better, than is the case with the separate particles.

The groups or clusters are seemingly bounded by curved limiting surfaces which offer little resistance to movement with respect to adjacent groups, clusters, or bodies, as compared with the sharper edges and corners of the individual particles.

The tube milling invention herein is applicable not only to bone dry hydrate but to so-called dry hydrate which, in fact, is not fully dry and contains a little moisture. Though there are existing methods by which the hydrate can be made bone dry and it can be made bone dry by my explosion process, this is not essential. There is some advantage in tube milling the product when there is a small percentage of moisture in the so-called dry hydrate. I have had excellent results in tube milling where there was three or four per cent of moisture, the results being somewhat better than with the same product in other respects which was bone dry.

I have had good results in tube milling for a short tube mill run where the moisture content of the lime milled was as high as seven per cent. The difficulty in tube milling with higher contents of moisture is that the tube mill tends to clog, i. e., the lime has a tendency not to pass through the mill as quickly and easily as it should when the moisture content increases beyond a small per cent. The question of what percentage of moisture causes inconvenience in clogging can be determined readily for the individual lime and mill used by tube milling the lime.

For the reasons above it is my intention to include as dry hydrated lime not only the hydrate which is bone dry but hydrate containing a low moisture content but which can be milled to the extent desired without undue clogging.

The example of hydration given provides a bone dry hydrate.

The moisture content of the lime can be controlled to leave a predetermined percentage of moisture, in many ways, such as:

(a) providing a greater excess of water with respect to the solid content in the hydrating cylinder (b) reducing the quantity of drying air supplied (c) lowering the temperature in the collector chamber (d) restricting the discharge of moisture-laden air from the chamber.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

The embodiment described herein, in which "Ohio" lime or other limes which develop a finishing lime plasticity upon soaking are hydrated by a process by which the calcium oxide is converted into the hydroxide without the use of an excess of water in the liquid phase and the major portion of the magnesia is hydrated, the dry hydrate then being pounded between surfaces to provide a hydrated lime product having instantaneous finishing lime plasticity, is not claimed herein, but is the subject matter of my copending application Serial No. 657,077, filed March 26, 1946, as a division of the present application.

Having thus described my invention what I claim as new and desire to secure by Letters Patent is:

1. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above atmospheric in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by the spontaneous vaporization of said surplus water due to the inherent heat of said hydrated lime so as to provide a powdery mass in which the particles of said hydrated lime are maintained in said finely divided condition; and subsequently clustering the finely divided hydrate in powder form by pounding between surfaces while maintaining the lime as a powder, whereby a hydrated lime product of improved properties, including the aforesaid plasticity, is obtained.

2. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above atmospheric in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by the spontaneous vaporization of said surplus water due to the inherent heat of said hydrated lime so as to provide a powdery mass in which the particles of said hydrated lime are maintained in said finely divided condition; and subsequently clustering the finely divided hydrate in powder form containing a small percentage of moisture by pounding between surfaces while maintaining the lime as a powder; whereby a hydrated lime product of improved properties, including the aforesaid plasticity, is obtained.

3. The process for producing a dry hydrated lime containing not less than 10% magnesia having improved properties and having a plasticity in excess of 200 available substantially immediately upon mixture with water as distinguished from a plasticity requiring hours of soaking to develop, which comprises hydrating the lime at a temperature above 212° F. and a pressure above atmospheric, sufficient to hydrate at least the major portion of the magnesia in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by the spontaneous vaporization of said surplus water due to the inherent heat of said hydrated lime so as to provide a powdery mass in which the particles of said hydrated lime are maintained in said finely divided condition; and subsequently clustering the finely divided hydrated lime in powder form by pounding between surfaces while maintaining the lime as a powder; whereby a hydrated lime product of improved properties, including the aforesaid plasticity, is obtained.

4. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above about 10 pounds per square inch in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by releasing the pressure to provide a powdery mass in which the particles of said hydrated lime are maintained in said finely divided condition; and subsequently clustering the finely divided hydrate in powder form by pounding between surfaces while maintaining the lime as a powder whereby a hydrated lime product of improved properties, including the aforesaid plasticity is obtained.

5. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above about 15 pounds per square inch in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by allowing it to expand instantaneously and vaporize off as steam due to the inherent heat of said hydrated lime so as to provide a powdery mass in which the particles of said hydrated lime are maintained in said finely divided condition; and subsequently clustering the finely divided particles in powder form by pounding between surfaces while maintaining the lime as a powder; whereby a hydrated lime product of improved properties, including the aforesaid plasticity, is obtained.

6. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above atmospheric in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by effecting a finely divided dispersion thereof into an atmosphere under conditions causing the substantially instantaneous conversion to the vapor phase of excess water to provide a powdery mass in which the particles of said hydrated lime are maintained in said finely divided condition; and subsequently clustering the finely divided particles in powder form by pounding between surfaces while maintaining the lime as a powder; whereby a hydrated lime product of improved properties, including the aforesaid plasticity, is obtained.

7. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above about 10 pounds per square inch in a closed chamber in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by the spontaneous discharge thereof from said closed container into a collecting chamber by suddenly releasing the pressure from the closed container to provide a powdery mass in which the particles of said hydrated lime are maintained in said finely divided condition; and subsequently clustering the finely divided particles in powder form by pounding between surfaces while maintaining the lime as a powder; whereby a hydrated lime product of improved properties, including the aforesaid plasticity, is obtained.

8. The process for producing a dry hydrated lime having improved properties, including a plasticity in excess of 200 available substantially immediately upon mixture with water as distinguished from a plasticity requiring hours of soaking to develop, which comprises hydrating the lime at a temperature above 212° F. and a pressure above about 40 pounds per square inch in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; suddenly releasing the pressure to explode the particles and to disperse and displace them; entraining air during the displacement; using the heat of the high temperature, the flashing of excess water from the liquid phase, and entrained air to remove at least the major portion of said surplus liquid water from the finely divided hydrated lime particles and to provide a powdery mass in which the particles of said hydrated lime are maintained in said finely divided condition; and subsequently clustering the finely divided particles in powder form by pounding between surfaces while maintaining the lime as a powder; whereby a hydrated lime product of improved properties, including the aforesaid plasticity, is obtained.

9. The process of treating lime containing not less than 10% magnesia which, when hydrated at atmospheric pressure in conventional manner develops plasticity of over 200 upon soaking over a period of hours, to produce a lime of improved properties, including a plasticity in excess of 200 available substantially immediately upon mixture with water which comprises hydrating the lime at a temperature above 212° F. and a pressure above atmospheric, sufficient to hydrate at least the major portion of the magnesia, in the presence of so large an excess of water in the liquid phase that the product after hydration contains a surplus of liquid water, water in the liquid phase coming into contact with practically every individual particle of the lime and each said individual particle being in contact with liquid phase water until the hydration of the calcium oxide content of that individual particle is completed; removing at least the major portion of said surplus liquid water from the finely divided hydrated lime particles by the spontaneous vaporization of said surplus water due to the inherent heat of said hydrated lime so as to provide a powdery mass in which the particles of said hydrated lime are maintained in said finely divided condition; and subsequently clustering the finely divided hydrate in powder form by pounding between surfaces while maintaining the lime as a powder; whereby a hydrated lime product of improved properties, including the aforesaid plasticity, is obtained.

10. The process for producing a dry hydrated lime containing not less than 10% magnesia and having improved properties, including a plasticity in excess of 200 available substantially immediately upon mixture with water as distinguished from a plasticity requiring hours of soaking to develop, which comprises substantially completely hydrating the calcium oxide in the presence of so large an excess of water in the liquid phase that the product after hydration of the calcium oxide contains a surplus of liquid water, water in the liquid phase coming into contact with practically every individual particle of the lime and each said individual particle being in contact with liquid phase water until the hydration of the calcium oxide content of that individual particle is completed; hydrating at least the major portion of the magnesia at a temperature above 212° F. and a pressure above atmospheric in the presence of so large an excess of water in the liquid phase that the product after hydration contains a surplus of liquid water; removing at least the major portion of said surplus liquid water from the finely divided hydrated lime particles by the spontaneous vaporization of said surplus water due to the inherent heat of said hydrated lime so as to provide a powdery mass in which the particles of said hydrated lime are maintained in said finely divided condition; and subsequently clustering the finely divided hydrate in powder form by pounding between surfaces while maintaining the lime as a powder; whereby a hydrated lime product of improved properties, including the aforesaid plasticity, is obtained.

11. The process for producing a dry hydrated lime containing not less than 10% magnesia and having improved properties, including a plasticity in excess of 200 available substantially immediately upon mixture with water as distinguished from a plasticity requiring hours of soaking to develop, which comprises substantially completely hydrating the calcium oxide in the presence of so large an excess of water in the liquid phase that the product after hydration of the calcium oxide contains a surplus of liquid water, water in the liquid phase coming into contact with practically every individual particle of the lime and each said individual particle being in contact with liquid phase water until the hydration of the calcium oxide content of that individual particle is completed; hydrating at least the major portion of the magnesia at a temperature above 212° F. and a pressure above atmospheric in the presence of so large an excess of water in the liquid phase that the product after hydration contains a surplus of liquid water; removing at least the major portion of said surplus liquid water from the finely divided hydrated lime particles by releasing the pressure to provide a powdery mass in which the particles of said hydrated lime are maintained in said finely divided condition; and subsequently clustering the finely divided hydrate in powder form by pounding between surfaces while maintaining the lime as a powder; whereby a hydrated lime product of improved properties, including the aforesaid plasticity, is obtained.

12. The process for producing a dry hydrated lime containing not less than 10% magnesia and having improved properties, including a plasticity in excess of 200 available substantially immediately upon mixture with water as distinguished from a plasticity requiring hours of soaking to develop, which comprises substantially completely hydrating the calcium oxide in the presence of so large an excess of water in the liquid phase that the product after hydration of the calcium oxide contains a surplus of liquid water, water in the liquid phase coming into contact with practically every individual particle of the lime and each said individual particle being in contact with liquid phase water until the hydration of the calcium oxide content of that individual particle is completed; hydrating at least the major portion of the magnesia at a temperature above 212° F. and a pressure above atmospheric in the presence of so large an excess of water in the liquid phase that the product after hydration contains a surplus of liquid water; removing at least the major portion of said surplus liquid water from the finely divided hydrated lime particles by effecting a finely divided dispersion thereof into an atmosphere under conditions causing the substantially instantaneous conversion to water vapor of excess water to provide a powdery mass in which the particles of said hydrated lime are maintained in said finely divided condition; and subsequently clustering the finely divided particles in powder form by pounding between surfaces while maintaining the lime as a powder; whereby a hydrated lime product of improved properties, including the aforesaid plasticity, is obtained.

13. The process for producing a dry hydrated lime containing not less than 10% magnesia and having improved properties, including a plasticity in excess of 200 available substantially immediately upon mixture with water as distinguished from a plasticity requiring hours of soaking to develop, which comprises substantially completely hydrating the calcium oxide in the presence of so large an excess of water in the liquid phase that the product after hydration of the calcium oxide contains a surplus of liquid water, water in the liquid phase coming into contact with practically every individual particle of the lime and each said individual particle being in contact with liquid phase water until the hydration of the calcium oxide content of that individual particle is completed; hydrating at least the major portion of the magnesia in a closed container at a temperature above 212° F. and a pressure above atmospheric in the presence of so large an excess of water in the liquid phase that the product after hydration contains a surplus of liquid water; removing at least the major portion of said surplus liquid water from the finely divided hydrated lime particles by the spontaneous discharge thereof from said closed container into a collecting chamber by suddenly releasing the pressure from the closed container to provide a powdery mass in which the particles of said hydrated lime are maintained in finely divided condition; and subsequently clustering the finely divided particles in powder form by pounding between surfaces while maintaining the lime as a powder; whereby a hydrated lime product of improved properties, including the aforesaid plasticity, is obtained.

14. The process for producing a dry hydrated lime containing not less than 10% magnesia and having improved properties, including a plasticity in excess of 200 available substantially immediately upon mixture with water as distinguished from a plasticity requiring hours of soaking to develop, which comprises substantially completely hydrating the calcium oxide in the presence of so large an excess of water in the liquid phase that the product after hydration of the calcium oxide contains a surplus of liquid water, water in the liquid phase coming into contact with practically every individual particle of the lime and each said individual particle being in contact with liquid phase water until the hydration of the calcium oxide content of that individual particle is completed, and said surplus liquid water not being substantially greater than that required for the hydration of the magnesia; hydrating at least the major portion of the magnesia at a temperature above 212° F. and a pressure above atmospheric to provide a substantially dry, finely divided hydrated product; and subsequently clustering the finely divided hydrate in powder form by pounding between surfaces while maintaining the lime as a powder; whereby a hydrated lime product of improved properties, including the aforesaid plasticity, is obtained.

15. A dry hydrated lime comprising clusters of individual finely divided particles and having improved properties, including a plasticity in excess of 200 available substantially immediately upon mixture with water as distinguished from a plasticity requiring hours of soaking to develop, which has had its calcium oxide substantially completely hydrated in the presence of so large an excess of water in the liquid phase that the product after hydration of the calcium oxide contained a surplus of liquid water, water in the liquid phase having come into contact with practically every individual particle of the lime and each said individual particle having been in contact with water in the liquid phase until the hydration of the calcium oxide content of that individual particle was completed, and which has been prepared by pounding in a powder form between surfaces to such as extent that its particles have been thus gathered into clusters while maintaining the lime as a powder.

16. The product of claim 15 wherein the dry hydrated lime is a high calcium lime.

17. The product of claim 15 wherein the dry hydrated lime contains not less than 10% magnesia, at least the major portion of which is in the hydrated form.

BOLTON L. CORSON.